(12) United States Patent
Park

(10) Patent No.: US 9,078,314 B2
(45) Date of Patent: Jul. 7, 2015

(54) LIGHT-EMITTING DIODE DRIVING CIRCUIT CAPABLE OF CONTROLLING CURRENT OF LIGHT-EMITTING DIODE ON A FULL TIME BASIS

(75) Inventor: Shihong Park, Seoul (KR)

(73) Assignee: POINT TEK INC., Yongin-si, Gyeonggi-do (KR)

( * ) Notice: Subject to any disclaimer, the term of this patent is extended or adjusted under 35 U.S.C. 154(b) by 765 days.

(21) Appl. No.: 13/390,931

(22) PCT Filed: Aug. 17, 2010

(86) PCT No.: PCT/KR2010/005426
§ 371 (c)(1),
(2), (4) Date: Feb. 16, 2012

(87) PCT Pub. No.: WO2011/021836
PCT Pub. Date: Feb. 24, 2011

(65) Prior Publication Data
US 2012/0146533 A1    Jun. 14, 2012

(30) Foreign Application Priority Data

Aug. 17, 2009 (KR) .......................... 10-2009-0075872
Oct. 12, 2009 (KR) .......................... 10-2009-0096932
Dec. 9, 2009 (KR) .......................... 10-2009-0121869

(51) Int. Cl.
*H05B 37/02* (2006.01)
*H05B 33/08* (2006.01)
*G09G 3/34* (2006.01)

(52) U.S. Cl.
CPC .......... *H05B 33/0815* (2013.01); *G09G 3/3406* (2013.01); *H05B 33/0848* (2013.01)

(58) Field of Classification Search
USPC .................................. 315/224, 287, 291, 294
See application file for complete search history.

(56) References Cited

U.S. PATENT DOCUMENTS

| | | | |
|---|---|---|---|
| 6,858,994 | B2 | 2/2005 | Vollrath |
| 2004/0041526 | A1 | 3/2004 | Vollrath |
| 2004/0080273 | A1 | 4/2004 | Ito et al. |
| 2007/0216602 | A1 | 9/2007 | Fujino |
| 2009/0066264 | A1* | 3/2009 | Huang et al. ................ 315/294 |
| 2009/0273290 | A1* | 11/2009 | Ziegenfuss .................... 315/193 |
| 2010/0060190 | A1* | 3/2010 | Cheng ........................... 315/291 |

FOREIGN PATENT DOCUMENTS

| | | |
|---|---|---|
| CN | 1440631 A | 9/2003 |
| CN | 101043773 A | 9/2007 |
| KR | 10-2007-0096242 A | 10/2007 |

* cited by examiner

*Primary Examiner* — William Hernandez
(74) *Attorney, Agent, or Firm* — Sherr & Jiang, PLLC

(57) ABSTRACT

Disclosed is a light-emitting diode (LED) driving circuit. The LED driving circuit includes a switching element configured to provide or interrupt input power to an LED, a first sensing element connected to the LED and configured to generate a feedback voltage corresponding to a current flowing through the LED, a controller having the same reference voltage as the first sensing element and configured to control an on/off operation of the switching element on the basis of the feedback voltage, and a first inductor and a diode connected to the LED and configured to provide the LED with a current induced during the on operation if the switching element is turned off.

6 Claims, 21 Drawing Sheets prior art prior art

LIGHT-EMITTING DIODE DRIVING CIRCUIT CAPABLE OF CONTROLLING CURRENT OF LIGHT-EMITTING DIODE ON A FULL TIME BASIS

CROSS REFERENCE TO PRIOR APPLICATIONS

This application is a National Stage patent application of PCT International Patent Application No. PCT/KR2010/005426 (filed on Aug. 17, 2010) under 35 U.S.C. §371, which claims priority to Korean Patent Application Nos. 10-2009-0075872 (filed on Aug. 17, 2009), 10-2009-0096932 (filed on Oct. 12, 2009), and 10-2009-0121869 (filed on Dec. 9, 2009), which are all hereby incorporated by reference in their entirety.

TECHNICAL FIELD

The present invention relates to a light-emitting diode (LED) driving circuit.

BACKGROUND ART

At present, LEDs are mainly used as backlights of liquid crystal displays (LCDs) used for a mobile phone, a personal digital assistant (PDA), a notebook computer, and the like. However, because efficiency and luminance have been significantly improved with the development of LED manufacturing technology, LEDs are also being widely used as general lighting, a guard lamp, a road lamp, and the like as well as a light source of a large LCD such as a television (TV). Fluorescent lamps currently in wide use are expected to be replaced with LEDs within 10 years due to the long life, environmental friendliness, and continuous optical efficiency improvement efforts of LEDs.

In general, when an LED is used as general lighting in a constant current source driving type, a commercial power-supply voltage of alternating current (AC) 220 V should be subjected to AC-direct current (DC) conversion. However, when a simplest diode rectifier is used without using a transformer, a DC voltage after the AC-DC conversion becomes about 310 V, which is a very high voltage to directly drive the LED. As a result, a voltage obtained by converting a primarily rectified voltage into a voltage suitable to drive the LED using a step-down DC-DC converter is used.

An LED current control circuit in a representative step-down DC-DC converter type is illustrated in FIG. 1. Referring to FIG. 1, a current flowing through the LED is detected using a resistor Rs in a source or emitter of a switching element SW. Although the current flowing through the LED may be detected through a voltage across the resistor Rs when the switching element SW is turned on, the current flowing through the LED is not detected if the switching element SW is turned off. Accordingly, only a maximum value of an output current is controlled by detecting and controlling the current only when the switching element SW is turned on. In this case, there is a problem in that an average value of the current flowing through the LED is not actually controlled because of a change according to magnitude of an input voltage and magnitude of a voltage across the LED.

To solve this problem, a method of detecting the current flowing through the LED using a separate current detection circuit including an insulated current sensor as illustrated in FIG. 2 may be used. However, there is a problem in that a simple current sensor is not available because high-voltage insulation characteristics of a current detection circuit are required in a high-voltage environment and a size and cost of the entire system are increased because a separate sensor having high-voltage insulation characteristics should be added.

DISCLOSURE OF INVENTION

Technical Problem

An object of the disclosed technology is to provide an LED driving circuit for constantly controlling a current flowing through an LED regardless of an on/off state of a switching element in a high-voltage environment as well as a low-voltage environment of an input voltage.

Another object of the disclosed technology is to provide an LED driving circuit capable of precisely controlling an average value of a current flowing through an LED or a voltage across the LED without a separate insulated current or voltage sensor and reducing pulsating of the current flowing through the LED.

Technical Solution

According to an exemplary embodiment for achieving the object of the disclosed technology, there is provided an LED driving circuit including: a switching element configured to provide or interrupt input power to an LED; a first sensing element connected to the LED and configured to generate a feedback voltage corresponding to a current flowing through the LED; a controller having the same reference voltage as the first sensing element and configured to control an on/off operation of the switching element on the basis of the feedback voltage; and a first inductor and a diode connected to the LED and configured to provide the LED with a current induced during the on operation if the switching element is turned off.

Advantageous Effects

The disclosed technology may have the following effects. However, this does not mean that a specific embodiment should include all or only these effects, and the scope of the disclosed technology should not be understood as being limited thereto.

According to an exemplary embodiment, an LED driving circuit may constantly directly control a current flowing through an LED regardless of an on/off operation of a switching element.

According to another exemplary embodiment, an LED driving circuit does not require a separate sensing element for constant current detection in a high-voltage environment, thereby reducing a size of a product and the number of elements.

According to another exemplary embodiment, an LED driving circuit may directly detect and control a voltage necessary to drive an LED regardless of an on/off operation of a switching element.

According to another exemplary embodiment, an LED driving circuit may reduce a size of the entire product and the number of elements by omitting an additional high insulated LED current detection circuit when an LED is driven in a high-voltage environment or a voltage detection circuit necessary to drive the LED.

BEST MODE FOR CARRYING OUT THE INVENTION

Exemplary embodiments of the disclosed technology are disclosed herein. However, specific structural and functional details disclosed herein are merely representative for purposes of describing exemplary embodiments of the disclosed technology, however, exemplary embodiments of the disclosed technology may be embodied in many alternate forms and should not be construed as limited to exemplary embodiments of the disclosed technology set forth herein.

The terminology used herein is for the purpose of describing particular embodiments only and is not intended to be limiting of the invention.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless the context clearly indicates a specific order, steps may occur out of the noted order. That is, the steps may be executed in the same order as noted, the steps may be executed substantially concurrently, or the steps may be executed in the reverse order.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
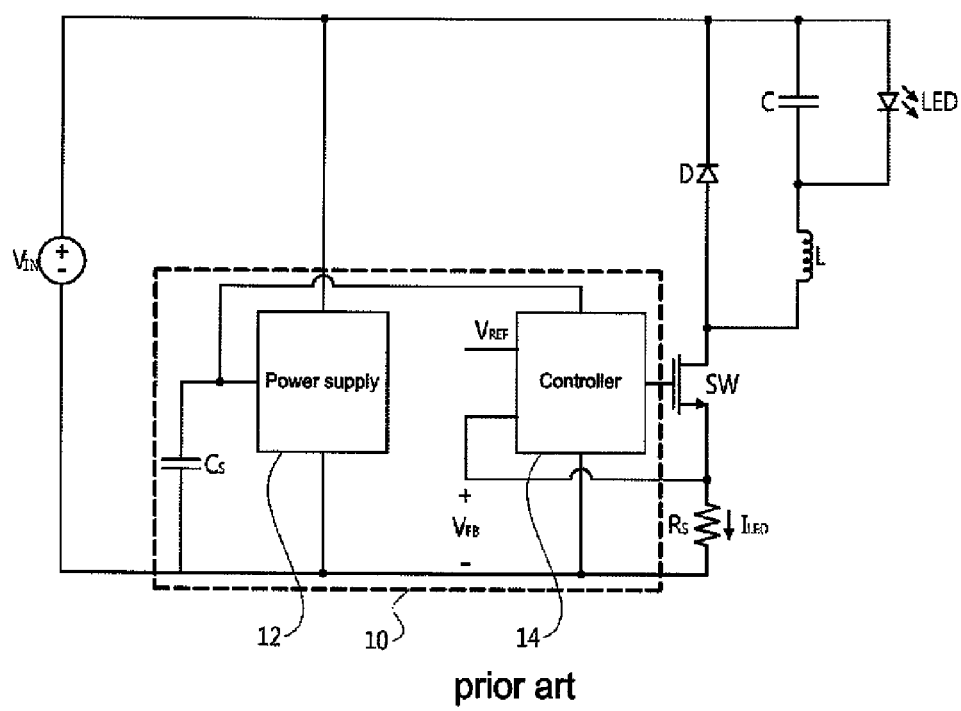
FIGS. 1 and 2 are circuit diagrams illustrating an LED driving circuit of the related art.
Figure 2:
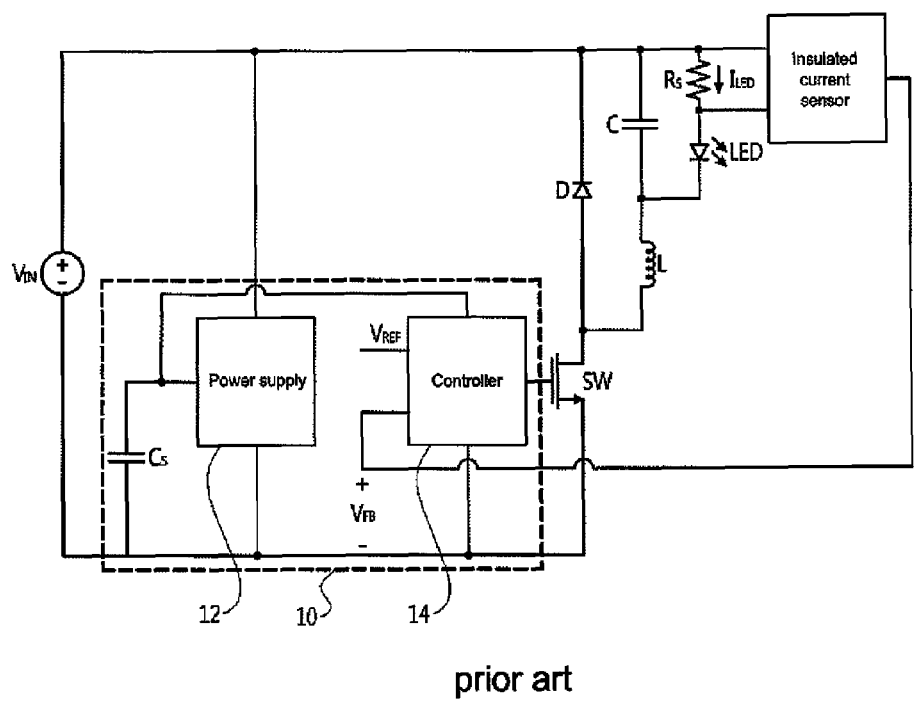
Figure 3:
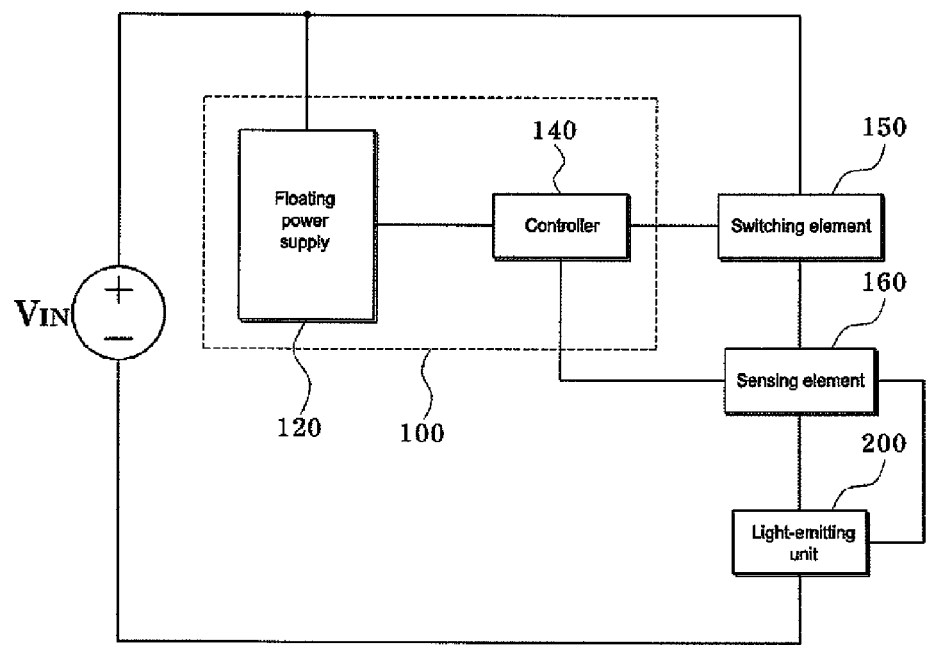
FIG. 3 is a block diagram illustrating an LED driving circuit according to an exemplary embodiment of the disclosed technology.

FIG. 3 is a block diagram illustrating an LED driving circuit according to an exemplary embodiment of the disclosed technology. Referring to FIG. 3, the LED driving circuit includes a floating power supply 120, a controller 140, a switching element 150, a sensing element 160, and a light-emitting unit 200. Here, the floating power supply 120 and the control 140 may constitute a step-down controller 100.

The floating power supply 120 operates by receiving power from an input power supply Vin and provides a drive voltage to the controller 140. The controller 140 operates by receiving the drive voltage from the floating power supply 120. The controller 140 receives a feedback voltage from the sensing element 160 and controls the switching element 150 to be turned on/off on the basis of the feedback voltage. The switching element 150 switches a connection between the input power supply Vin and the light-emitting unit 200 according to control of the controller 140. The switching element 150 provides or does not provide power from the input power supply Vin to the light-emitting unit 200 according to the control of the controller 140.

The sensing element 160 generates a feedback voltage by sensing a current flowing through an LED included in the light-emitting unit 200 regardless of an on/off state of the switching element 150, and feeds the feedback voltage back to the controller 140. For example, the sensing element 160 may be implemented by a sensing resistor.

First, the current flowing through the LED is increased while the switching element 150 is turned on, so that the magnitude of the feedback voltage to be fed back from the sensing element 160 to the controller 140 is also increased. If the feedback voltage exceeds a reference voltage, the controller 140 turns off the switching element 150. The current flowing through the LED is decreased while the switching element 150 is turned off, so that the magnitude of the feedback voltage fed back from the sensing element 160 to the controller 140 is also decreased. If the feedback voltage is less than the reference voltage, the controller 140 turns on the switching element 150. Through this, the controller 140 may control the current flowing through the LED to be constant.

The light-emitting unit 200 is constituted by the LED, a diode, and an inductor (or transformer), and may include a filter capacitor. By connecting the diode and the inductor (or transformer) to the LED, the current flowing through the LED is maintained while the switching element 150 is turned of By connecting the filter capacitor to the LED, it is possible to reduce the ripple of the current flowing though the LED.

Figure 4:
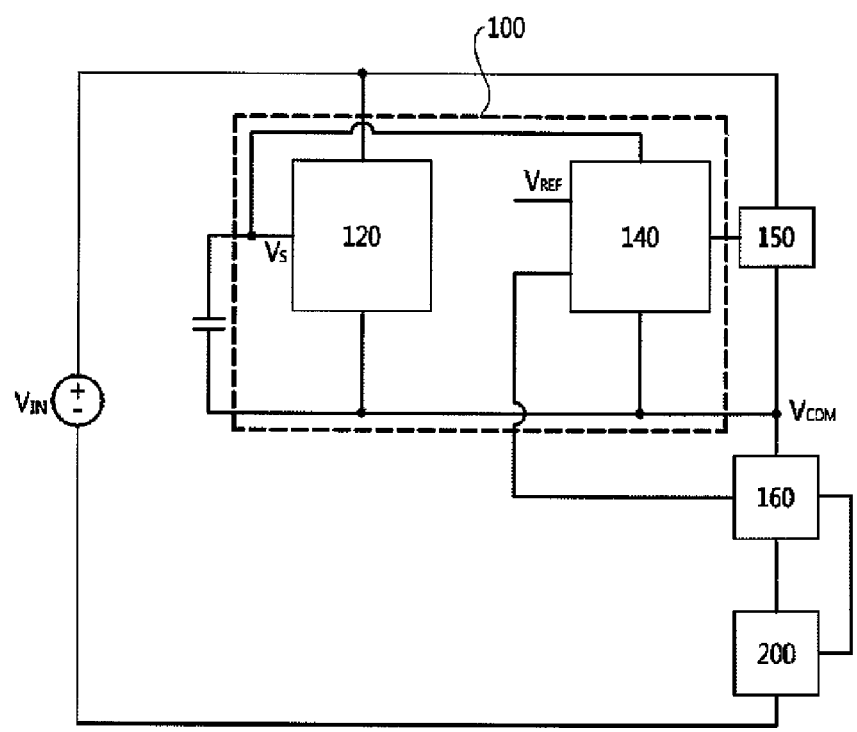
FIG. 4 is a block diagram illustrating a step-down LED driving circuit according to an exemplary embodiment of the disclosed technology.

FIG. 4 is a block diagram illustrating a step-down LED driving circuit according to an exemplary embodiment of the disclosed technology.

Referring to FIG. 4, the step-down LED driving circuit includes a floating power supply 120, a controller 140, a switching element 150 connected to the controller 140, a sensing resistor Rs connected to the switching element 150, and an LED connected to the sensing resistor Rs. Here, the floating power supply 120 and the controller 140 may constitute a step-down controller 100.

The floating power supply 120 connected to an input power supply Vin and a common terminal Vcom receives power from the input power supply Vin. The floating power supply 120 provides the controller 140 with a constant drive voltage based on a voltage of the common terminal Vcom regardless of a voltage change of the common terminal Vcom.

The controller 140 connected to the floating power supply 120 and the common terminal Vcom operates by receiving power from the floating power supply 120. The controller 140 receives a feedback voltage $V_{FB}$ from the sensing resistor Rs, and controls a current flowing through the LED to be constant by controlling the on/off operation of the switching element 150 on the basis of the feedback voltage $V_{FB}$.

According to control of the controller 140, the switching element 150 switches on/off of a connection between the input power supply Vin and the LED. For example, the switching element 150 may include at least one of a metal-oxide semiconductor field-effect transistor (MOSFET), an insulated gate bipolar transistor (IGBT), a bipolar junction transistor (BJT), and a junction field-effect transistor (JFET).

The sensing resistor Rs connected to the switching element 150 and the LED generates the feedback voltage $V_{FB}$ by sensing the current flowing through the LED and feeds the feedback voltage $V_{FB}$ back to the controller 140. The sensing resistor Rs generates the feedback voltage $V_{FB}$ in proportion to the current flowing through the LED.

Figure 5:
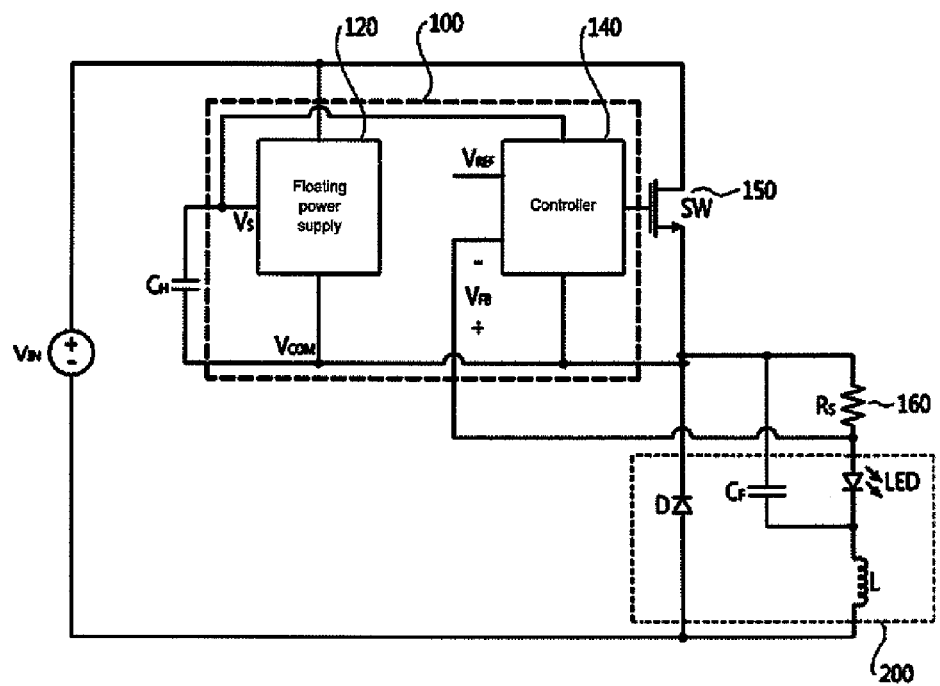
FIG. 5 is a circuit diagram illustrating the step-down LED driving circuit of FIG. 4.

FIG. 5 is a circuit diagram illustrating the step-down LED driving circuit of FIG. 4. Referring to FIG. 5, the step-down LED driving circuit includes a floating power supply 120, a controller 140, a switching element 150 connected to the controller 140, a sensing resistor Rs connected to the switching element 150, an LED connected to the sensing resistor Rs, and an inductor L and a filter capacitor $C_F$ connected to the LED. Here, the floating power supply 120 and the controller 140 may constitute a step-down controller 100.

The step-down controller 100 performs a function of substantially constantly maintaining the current flowing through the LED by controlling the duty of the switching element 150. The step-down controller 100 includes the floating power supply 120 and the controller 140.

The floating power supply 120 connected to an input power supply Vin and a common terminal Vcom receives power from the input power supply Vin. Because the floating power supply 120 is connected to the common terminal Vcom without being grounded, a constant drive voltage based on a voltage of the common terminal Vcom can be provided to the controller 140 regardless of a voltage change of the common terminal Vcom. For example, the floating power supply 120 may use any one of a transformer type, a charge pump type, and a bootstrap type. Although an example of the bootstrap type in which a bootstrap capacitor $C_H$ is added to an output end of the floating power supply 120 is illustrated in this exemplary embodiment, the disclosed technology is not limited thereto.

The controller 140 connected to the floating power supply 120 and the common terminal Vcom receives power from the floating power supply 120. The controller 140 receives a feedback voltage $V_{FB}$ from the sensing resistor Rs and enables a constant current to flow through the LED by controlling the on/off operation of the switching element 150 on the basis of the feedback voltage $V_{FB}$. For example, the controller 140 compares the feedback voltage $V_{FB}$ to a reference voltage $V_{REF}$, increases the current flowing through the LED and the inductor L by turning on the switching element 150 if the feedback voltage $V_{FB}$ is lower than the reference voltage $V_{REF}$, and decreases the current flowing through the LED and the inductor L by turning off the switching element 150 if the feedback voltage $V_{FB}$ is higher than the reference voltage $V_{REF}$. Through this, the controller 140 may control the feedback voltage $V_{FB}$ generated by the current flowing through the LED to converge into the reference voltage $V_{REF}$. The controller 140 may be implemented with pulse width modulation (PWM) control using an integrator, pulse frequency modulation (PFM) control, or hysteresis control having a comparison function with no integrator.

The controller 140 may generate a small-signal duty signal according to a result of the comparison between the feedback voltage $V_{FB}$ and the reference voltage $V_{REF}$, and provide high current driving capability by buffering the small-signal duty signal. Through this, the controller 140 may switch the high-power switching element 150 at a high frequency.

The switching element 150 connected to the input power supply Vin and the common terminal Vcom switches on/off of a connection between the input power supply Vin and the LED according to control of the controller 140. The switching element 150 connects the input power supply Vin to the LED or disconnects the input power supply Vin from the LED according to the control of the controller 140.

The sensing resistor Rs connected to the common terminal Vcom and the LED generates the feedback voltage $V_{FB}$ according to a current flowing through the sensing resistor Rs, and feeds the feedback voltage $V_{FB}$ back to the controller 140. Here, the feedback voltage $V_{FB}$ from the sensing resistor Rs to the controller 140 conforms to Ohm's law of the following Equation (1).

$$V_{FB} = R_R{}^s \times I_{LED} \qquad \text{[Equation 1]}$$

Here, $V_{FB}$ is a feedback voltage, $R_R{}^s$ is a resistance value of the sensing resistor Rs, and $I_{LED}$ is a value of a current flowing through the LED.

The LED emits light by receiving the current. Here, because the LED receives substantially a constant current, the LED emits constant-intensity light.

The inductor L connected to the LED and the input power supply Vin generates a counter electromotive force to maintain the current flowing through the LED when the current flowing through the LED changes. For example, if the switching element 150 is turned on, the inductor L enables the current flowing through the LED to be gradually increased. If the switching element 150 is turned off, the inductor L enables the current flowing through the LED to be gradually decreased through a diode D. The inductor L functions as a current source that provides the LED with a constant current by integrating voltage values at two ends of the inductor L changing according to a switching on/off operation of the switching element 150.

The filter capacitor $C_F$ is connected between the switching element 150 and the inductor L in series and connected to the sensing resistor Rs and the LED in parallel, and reduces the ripple of the current flowing through the LED. If the capacity of the filter capacitor $C_F$ is large, the current flowing through the inductor L is different from the current flowing through the LED. Because the current flowing through the inductor L is filtered by the filter capacitor $C_F$ having a large capacity and indicated by a voltage of an integrated value, the current flowing through the LED may be controlled by controlling the voltage stored in the filter capacitor $C_F$.

Figure 9:
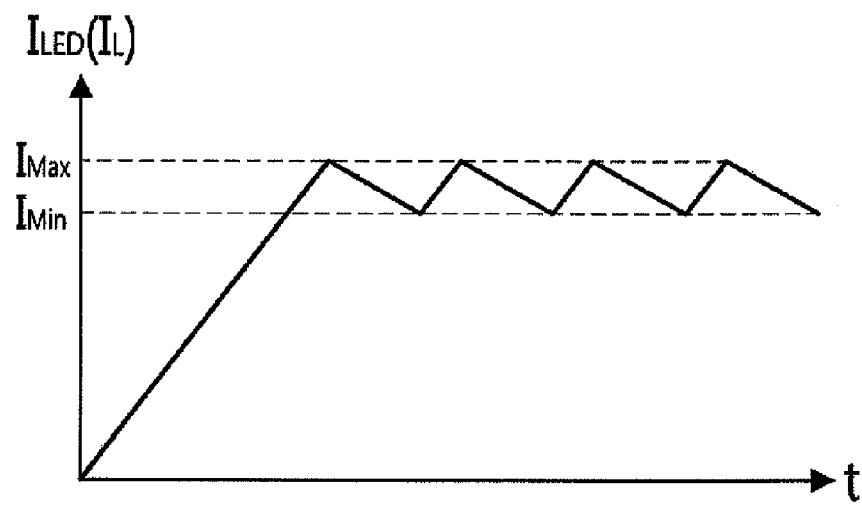
FIG. 9 is a diagram illustrating a current waveform of an inductor when hysteresis control is applied to the step-down LED driving circuit illustrated in FIG. 5.

Here, the filter capacitor $C_F$ may be omitted. If the filter capacitor $C_F$ is omitted, the current flowing through the inductor L is the same as the current flowing through the LED. Accordingly, a hysteresis control method may be applied in which maximum and minimum values of the current flowing through the LED are set, the controller 140 turns off the switching element 150 if the current flowing through the LED reaches the maximum value, and the controller 140 turns on the switching element 150 if the current flowing through the LED reaches the minimum value. This hysteresis control method may be applied even when the capacity of the filter capacitor $C_F$ is small. FIG. 9 is a diagram illustrating a current waveform of the inductor when the hysteresis control is applied to the step-down LED driving circuit illustrated in FIG. 5. Referring to FIG. 9, an average value may be controlled by controlling the current of the inductor L to operate between a maximum current value $I_{Max}$ and a minimum current value $I_{Min}$. Here, the current flowing through the inductor L is the same as the current flowing through the LED.

The diode D connected to the common voltage Vcom provides a path in which a current flows through the sensing resistor Rs, the LED, and the inductor L while the switching element 150 is turned off.

The bootstrap capacitor $C_H$ connected to the floating power supply 120 and the common terminal Vcom provides a constant drive voltage to the controller 140 even when a voltage of the common terminal Vcom changes. The bootstrap capacitor $C_H$ performs a charging operation while the switching element 150 is turned off, and provides a charged voltage to the controller 140 if the switching element 150 is turned on. Through this, in a state in which the switching element 150 is turned off and the common terminal Vcom is short to the ground, a constant drive voltage may be provided to the controller 150 even when the switching element 150 is turned on and the common terminal Vcom is connected to the input power supply Vin.

Figure 6:
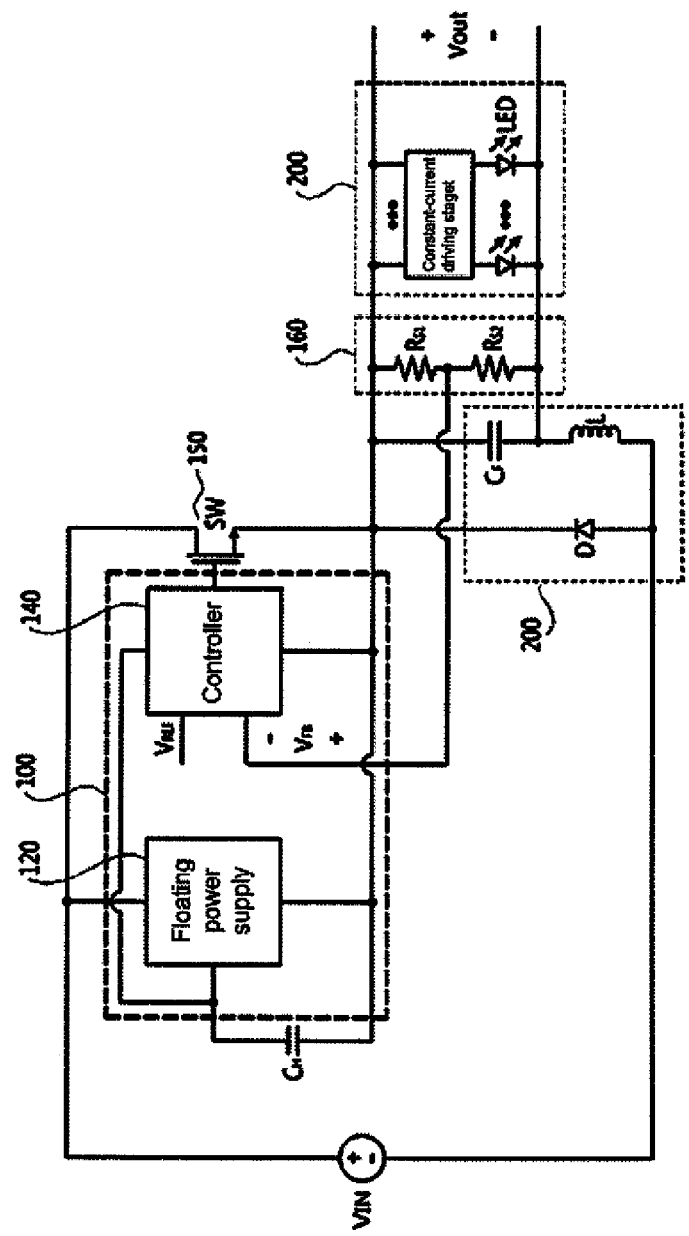
FIG. 6 is another circuit diagram illustrating the step-down LED driving circuit of FIG. 4.

FIG. 6 is another circuit diagram illustrating the step-down LED driving circuit of FIG. 4. In the step-down LED driving circuit of FIG. 6, a floating power supply 120, a controller 140, and a switching element 150 perform substantially the same functions as described with reference to FIG. 5.

The controller 140 compares a feedback voltage $V_{FB}$ detected through two sensing resistors Rs1 and Rs2 to a reference voltage $V_{REF}$, and enables the feedback voltage $V_{FB}$ to be substantially the same as the reference voltage $V_{REF}$ by controlling the on/off operation of the switching element 150. Accordingly, the output voltage Vout is constantly maintained. On the basis of the output voltage Vout, it is possible to directly drive an LED or drive a plurality of LEDs by adding a constant-current driving stage. Here, the output voltage Vout is applied to the above-described PWM control method, and may be controlled to a constant voltage. A relationship between the feedback voltage $V_{FB}$ detected through the two sensing resistors Rs1 and Rs2 and the output voltage Vout may be expressed by the following Equation (2).

$$V_{FB} = \frac{Rs1}{Rs1 + Rs2} \times V_{OUT} \text{ or}$$
$$V_{OUT} = \left(1 + \frac{Rs2}{Rs1}\right) V_{FB} = \left(1 + \frac{Rs2}{Rs1}\right) V_{VREF}$$
[Equation 2]

Here, $V_{FB}$ is a feedback voltage, and Rs1 and Rs2 are resistance values of the sensing resistors, and $V_{VREF}$ is a reference voltage of the controller.

In FIG. 6, it is possible to obtain the constant output voltage Vout by controlling the feedback voltage $V_{FB}$ input to the controller under conditions of the fixed sensing resistors Rs1 and Rs2 and drive the LED using the constant output voltage Vout.

Figure 7:
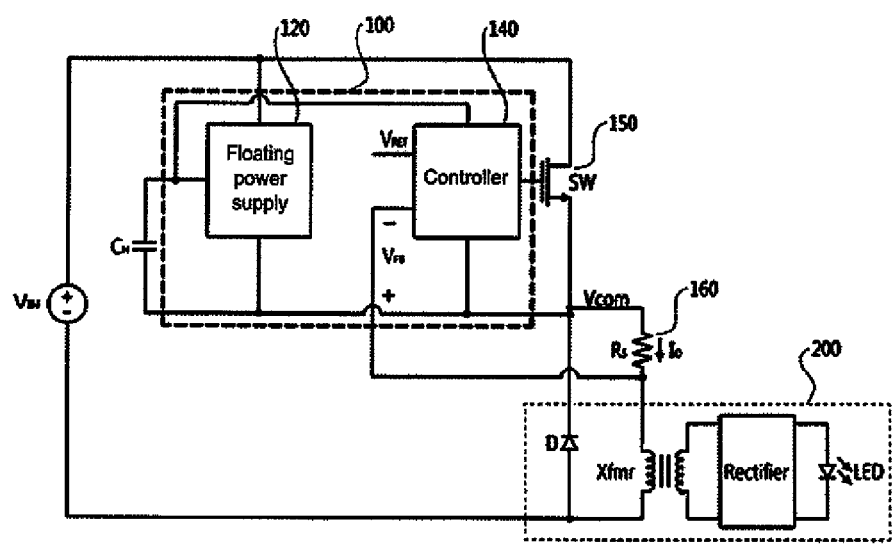
FIGS. 7 and 8 are circuit diagrams illustrating modifications of a circuit configuration of the circuit diagram illustrated in FIG. 5.
Figure 8:
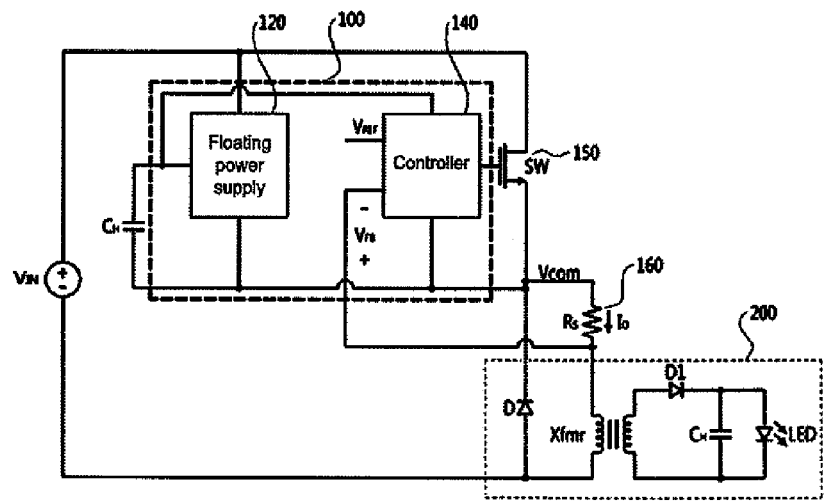

FIGS. 7 and 8 are circuit diagrams illustrating modifications of a circuit configuration of the circuit diagram illustrated in FIG. 5.

As compared to the LED driving circuit illustrated in FIG. 5, the LED driving circuit illustrated in FIG. 7 further includes a transformer Xfmr and a rectifier. Referring to FIG. 7, a primary side of the transformer Xfmr is connected to the sensing resistor Rs in series, and a secondary side of the transformer Xfmr is connected to the LED through the rectifier. The transformer Xfmr electrically insulates the LED from the LED driving circuit, and the rectifier stabilizes a current so that the current flows through the LED in one direction. Here, the transformer Xfmr may be implemented by adding a secondary-side inductor to the configuration of FIG. 5 when the inductor L of FIG. 5 is designated as a primary-side inductor.

The controller 140 substantially constantly controls a primary-side current of the transformer Xfmr by controlling the on/off operation of the switching element 150 on the basis of the feedback voltage $V_{FB}$. In addition, because a secondary-side current of the transformer Xfmr is determined according to the primary-side current and a ratio of turns (a constant) of the transformer Xfmr, the secondary-side current is also constantly controlled. Consequently, the current of the LED is also constantly controlled. The LED driving circuit to which the transformer Xfmr is added may obtain driving characteristics according to electrical insulation from the primary side.

In a step-down LED driving circuit illustrated in FIG. 8 compared to the LED driving circuit illustrated in FIG. 7, the rectifier is implemented by a diode D1 and a capacitor $C_H$. Referring to FIG. 8, the primary side of the transformer Xfmr is connected to the sensing resistor Rs in series, and the secondary side of the transformer Xfmr is connected to the LED through the rectifier implemented by the diode D1 and the capacitor $C_H$.

Figure 10:
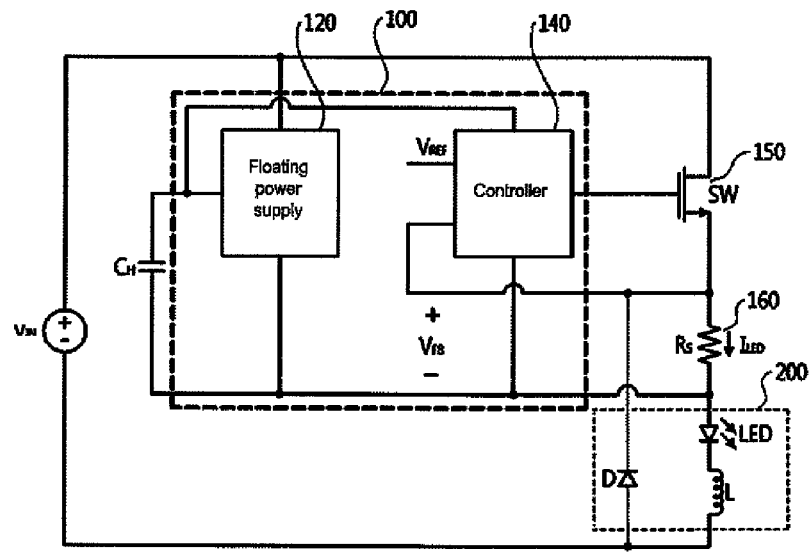
FIG. 10 is still another circuit diagram illustrating the step-down LED driving circuit of FIG. 4.

FIG. 10 is still another circuit diagram illustrating the step-down LED driving circuit of FIG. 4. The step-down LED driving circuit illustrated in FIG. 10 compared to FIG. 4 corresponds to a circuit in which the feedback voltage $V_{FB}$ to be fed back to the controller 140 is changed to a positive (+) voltage. For this, a high-voltage terminal of the sensing resistor Rs is connected to an input terminal of the feedback voltage $V_{FB}$ of the controller 140 and a low-voltage terminal of the sensing resistor Rs is connected to the common voltage Vcom so that the feedback voltage $V_{FB}$ detected by the sensing resistor Rs is higher than the voltage of the common terminal Vcom.

FIGS. 11 to 14 are circuit diagrams illustrating modifications of a circuit configuration of the circuit diagram illustrated in FIG. 10.

Figure 11:
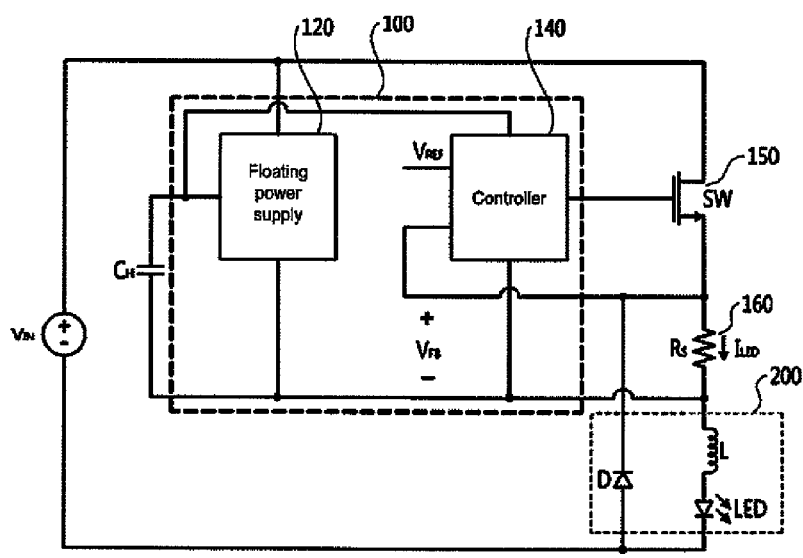
FIGS. 11 to 14 are circuit diagrams illustrating modifications of a circuit configuration of the circuit diagram illustrated in FIG. 10.

In an LED driving circuit illustrated in FIG. 11 compared to the LED driving circuit illustrated in FIG. 10, positions of the LED and the inductor L are changed.

Figure 12:
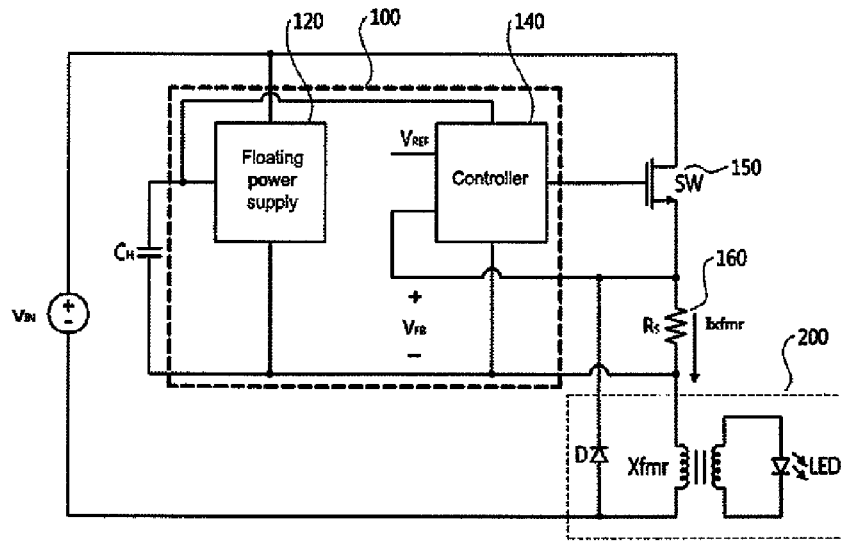

As compared to the LED driving circuit of FIG. 10, a step-down LED driving circuit illustrated in FIG. 12 further includes a transformer Xfmr. Referring to FIG. 12, a primary side of the transformer Xfmr is connected to the sensing resistor Rs in series and a secondary side of the transformer Xfmr is connected to the LED. The transformer Xfmr electrically insulates the LED from the LED driving circuit. Here, the transformer Xfmr may be implemented by a configuration in which a secondary-side inductor is added to FIG. 5 if the inductor L of FIG. 10 is designated as a primary-side inductor.

Figure 13:
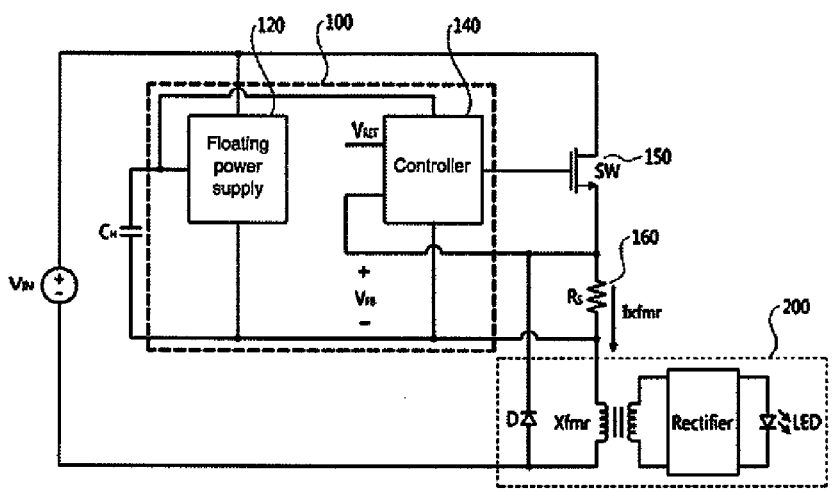

As compared to the LED driving circuit of FIG. 12, a step-down LED driving circuit illustrated in FIG. 13 further includes a rectifier between the secondary side of the transformer Xfmr and the LED. The rectifier may provide a more stable current to the LED.

Figure 14:
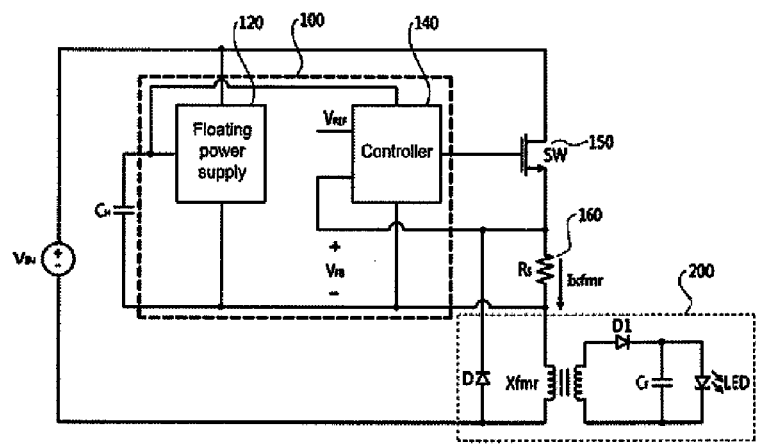

In a step-down LED driving circuit illustrated in FIG. 14 compared to the LED driving circuit of FIG. 13, the rectifier is implemented by a diode D1 and a capacitor $C_H$. Referring to FIG. 14, the primary side of the transformer Xfmr is connected to the sensing resistor Rs in series and the secondary side of the transformer Xfmr is connected to the LED through the rectifier implemented by the diode D1 and the capacitor $C_H$.

Figure 15:
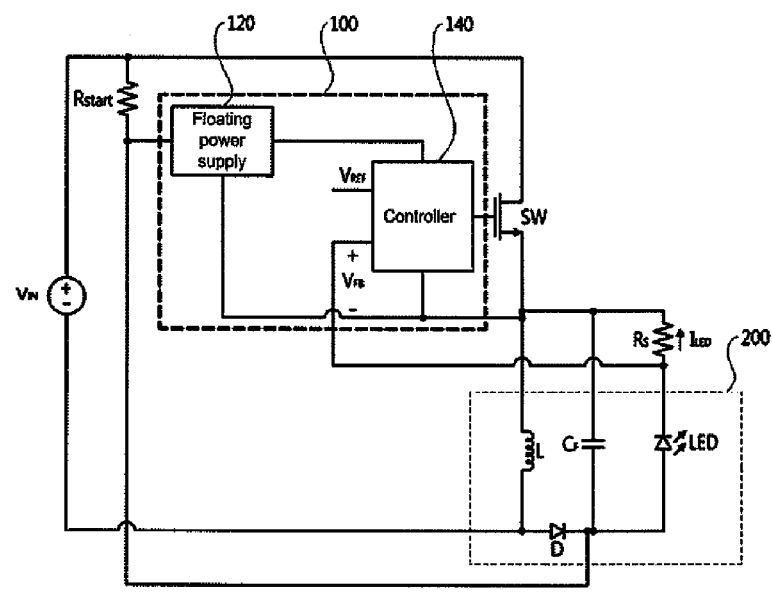
FIG. 15 is a circuit diagram illustrating a step-up/down LED driving circuit according to an exemplary embodiment of the disclosed technology.

FIG. 15 is a circuit diagram illustrating a step-up/down LED driving circuit according to an exemplary embodiment of the disclosed technology.

Referring to FIG. 15, the step up/down LED driving circuit includes a floating power supply 120, a controller 140, a switching element 150 connected to the controller 140, a sensing resistor Rs connected to the switching element 150, an LED connected to the sensing resistor Rs, an inductor L and a filter capacitor $C_F$ connected to the sensing resistor Rs and the LED in parallel, a diode D connected to the inductor L and the filter capacitor $C_F$, and a start resistor Rstart connected to an input power supply Vin and the floating power supply 120. Here, the floating power supply 120 and the controller 140 constitute a step-down controller 100.

The step-down controller 100 performs a function of substantially constantly maintaining a current flowing through the LED by controlling the duty of the switching element 150. The step-down controller 100 includes the floating power supply 120 and the controller 140.

The floating power supply 120 is connected to the input power supply Vin through the start resistor Rstart and connected to the filter capacitor $C_F$, and receives power from the filter capacitor $C_F$. Because the switching element 150 is turned off when the LED driving circuit is initially driven, the input power supply Vin raises a voltage of the filter capacitor $C_F$ through the start resistor Rstart having a large resistance value. In addition, the filter capacitor $C_F$ provides a drive voltage to the floating power supply 120. Because the input power supply Vin, which is usually a commercial AC power supply, is much higher than a voltage used to drive the LED, it is efficient to use a voltage charged in the filter capacitor $C_F$ as a drive voltage of the floating power supply 120.

The controller 140 receives power from the floating power supply 120 and receives a feedback voltage $V_{FB}$ from the sensing resistor Rs. The controller 140 enables a substantially constant current to flow through the LED by controlling the on/off operation of the switching element 150 on the basis of the feedback voltage $V_{FB}$. For example, the controller 140 compares the feedback voltage $V_{FB}$ to a reference voltage $V_{REF}$, increases the current flowing through the LED and the inductor L by turning on the switching element 150 if the feedback voltage $V_{FB}$ is lower than the reference voltage $V_{REF}$, and decreases the current flowing through the LED and the inductor L by turning off the switching element 150 if the feedback voltage $V_{FB}$ is higher than the reference voltage $V_{REF}$. Through this, the controller 140 may control the feedback voltage $V_{FB}$ generated by the current flowing through the LED to converge into the reference voltage V. The controller 140 may be implemented with PWM control using an integrator, PFM control, or hysteresis control having a comparison function with no integrator.

The controller 140 may generate a small-signal duty signal according to a result of a comparison between the feedback voltage $V_{FB}$ and the reference voltage $V_{REF}$, and provide high current driving capability by buffering the small-signal duty signal. Through this, the controller 140 may switch the high-power switching element 150 at a high frequency.

According to control of the controller 140, the switching element 150 connected to the input power Vin and the inductor L switches on/off of a connection between the input power supply Vin and the LED. For example, the switching element 150 may include at least one of MOSFET, IGBT, BJT, and JFET.

The sensing resistor Rs generates the feedback voltage $V_{FB}$ according to the current flowing through the sensing resistor Rs, and feeds the feedback voltage $V_{FB}$ back to the controller 140. Here, the feedback voltage $V_{FB}$ to be fed back from the sensing resistor Rs to the controller 140 conforms to Ohm's law of the above Equation (1).

The inductor L is connected to the sensing resistor Rs and the LED in parallel through the diode D and connected to the filter capacitor $C_F$ in parallel. For example, if the switching element 150 is turned on by the controller 140, a current flowing through the inductor L is increased and a voltage between two ends of the filter capacitor $C_F$ is increased. Therefore, the current flowing through the LED is increased and the feedback voltage $V_{FB}$ is increased. If the feedback voltage $V_{FB}$ is higher than the reference voltage $V_{REF}$, the switching element 150 is turned off by the controller 140 and a current flowing through the inductor L, a current flowing through the LED, and the feedback voltage $V_{FB}$ are decreased. If the feedback voltage $V_{FB}$ is less than the reference voltage $V_{REF}$, the switching element 150 is turned on by the controller 140. Through this, a substantially constant current may be provided to the LED and the LED may emit constant-intensity light.

FIGS. 16 to 22 are circuit diagrams illustrating modifications of the circuit configuration of the circuit diagram illustrated in FIG. 15.

Figure 16:
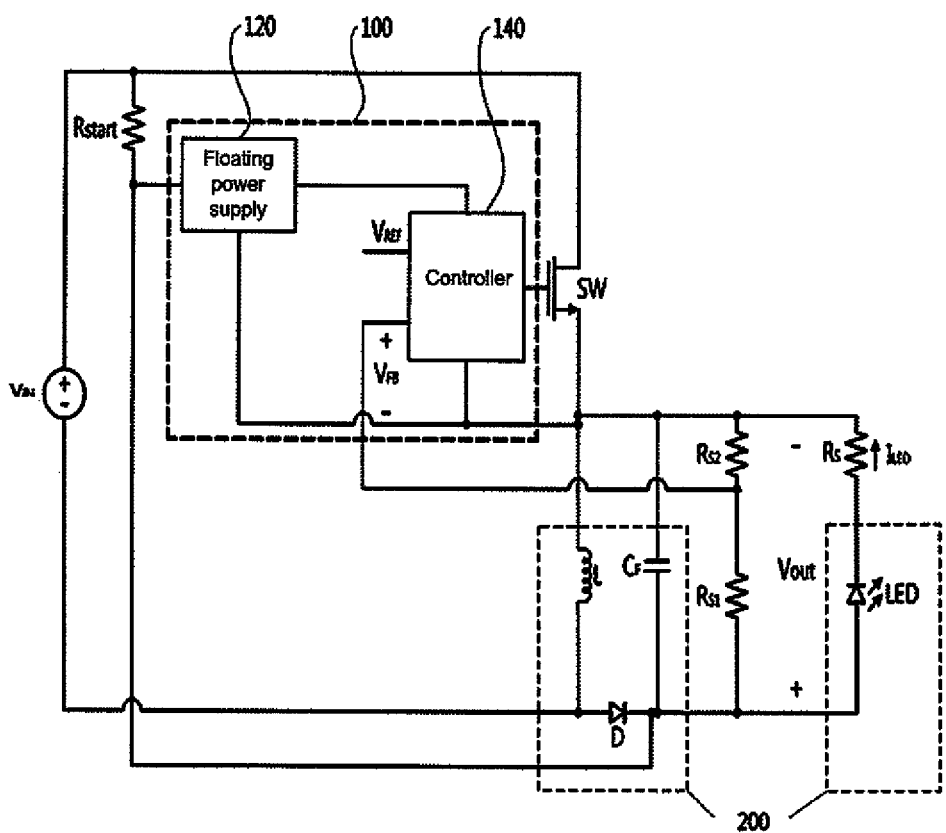
FIGS. 16 to 25 are circuit diagrams illustrating modifications of a circuit configuration of the circuit diagram illustrated in FIG. 15.

As compared to the circuit illustrated in FIG. 15, an LED driving circuit illustrated in FIG. 16 corresponds to a circuit in which two sensing resistors Rs1 and Rs2 are additionally connected to two ends of the LED and the resistor Rs in parallel, a voltage between two ends of the sensing resistor Rs1 is designated as the feedback voltage $V_{FB}$, and the feedback voltage $V_{FB}$ is fed back to the controller 140. According to a switching operation of the controller 140, the output voltage Vout, which is a voltage between two ends of the sensing resistors Rs1 and Rs2, is constantly maintained, and also a current flowing through the LED is substantially constantly maintained.

Figure 17:
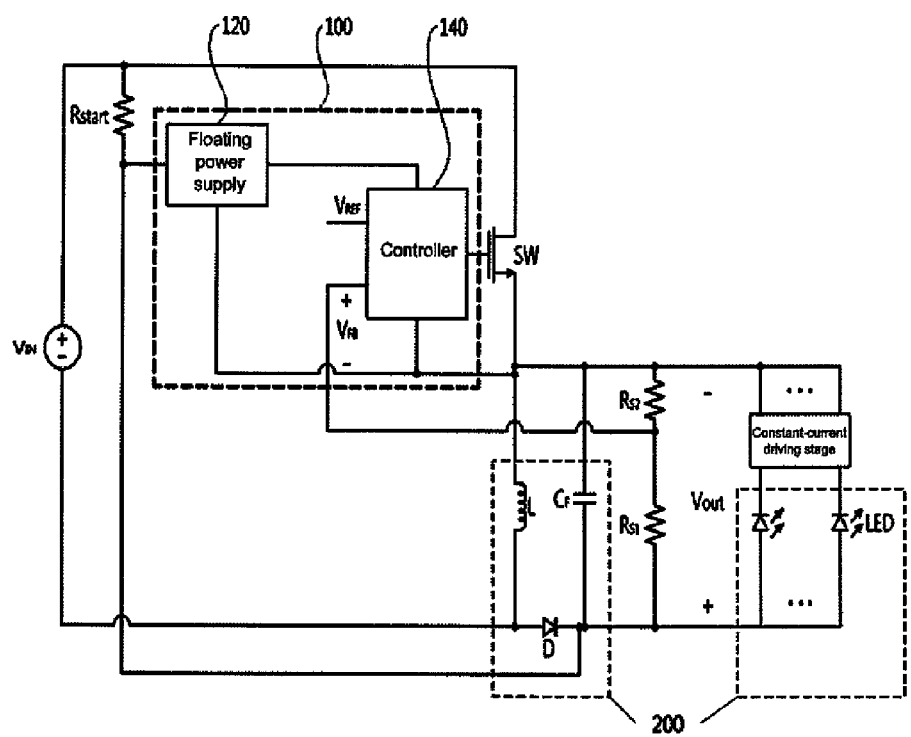

In an LED driving circuit illustrated in FIG. 17 compared to the LED driving circuit illustrated in FIG. 16, the resistor Rs is replaced with a constant-current driving stage and a plurality of LEDs are included. As in the LED driving circuit illustrated in FIG. 16, the output voltage Vout is constantly maintained and also the current flowing through the LED is constantly maintained.

Figure 18:
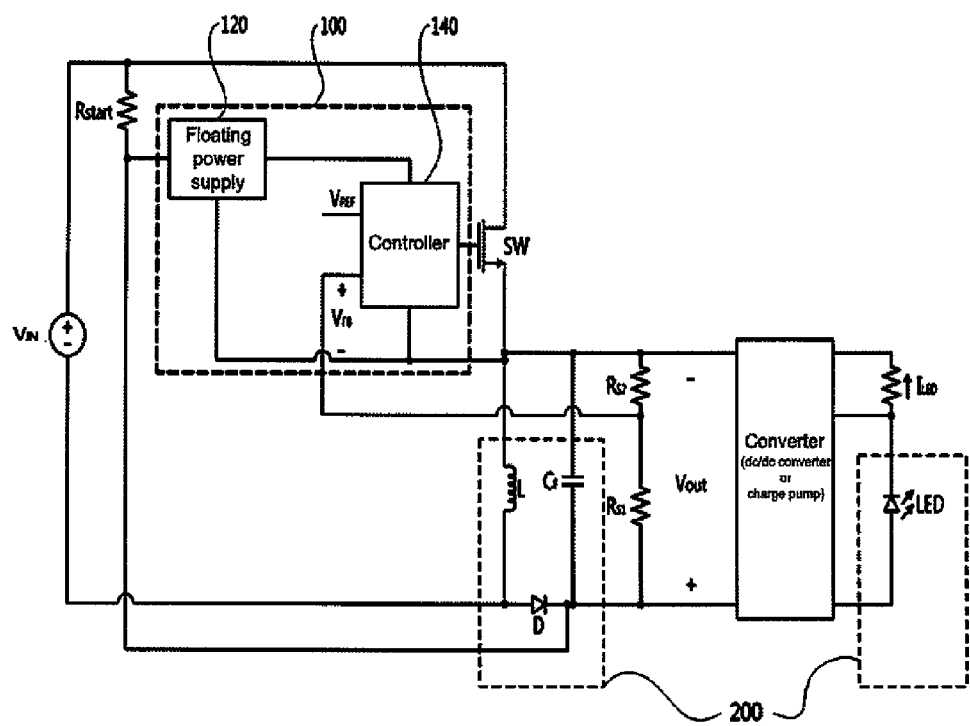

As compared to the LED driving circuit illustrated in FIG. 16, the LED driving circuit illustrated in FIG. 18 further includes a converter. Here, the converter may include a DC-DC converter or a charge pump. Because the converter provides a necessary constant output voltage Vout to the resistor Rs and the LED, the current flowing through the LED is constant.

Figure 19:
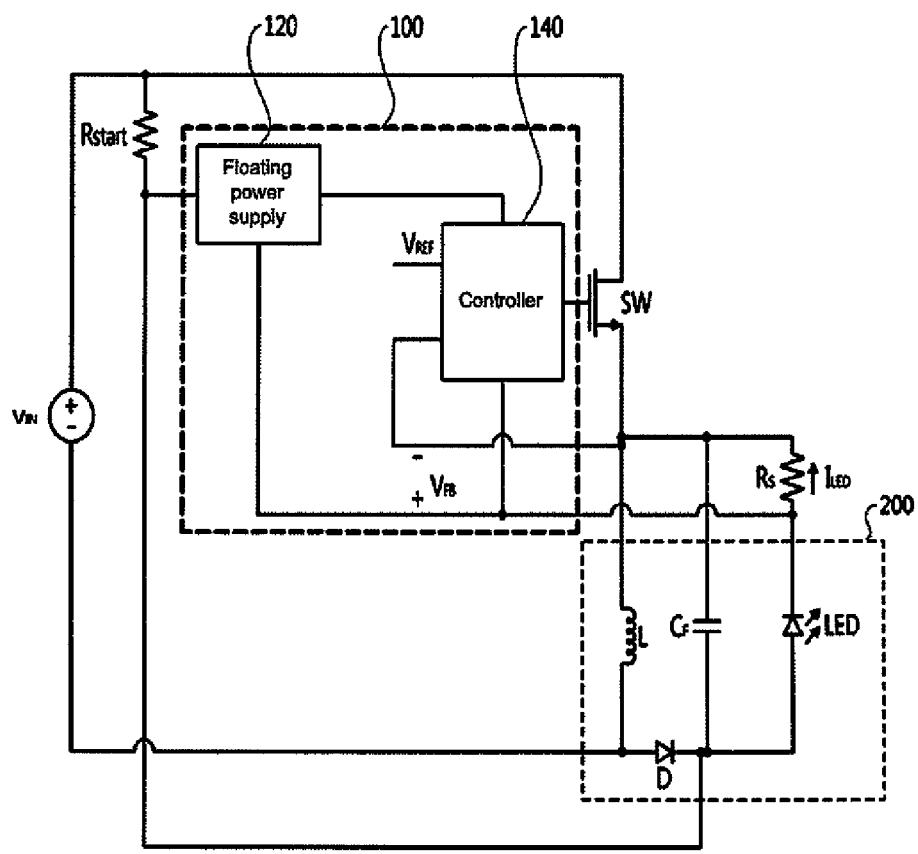

In the LED driving circuit illustrated in FIG. 19 compared to that of FIG. 15, the feedback voltage $V_{FB}$ to be fed back to the controller 140 is changed to a negative (−) voltage. For this, a high-voltage terminal of the sensing resistor Rs is connected to a common node and a low-voltage terminal of the sensing resistor Rs is connected to the controller 140 so that the feedback voltage $V_{FB}$ detected by the sensing resistor Rs is lower than the voltage of the common node of the floating power supply 120, the controller 140, and the sensing resistor Rs.

Figure 20:
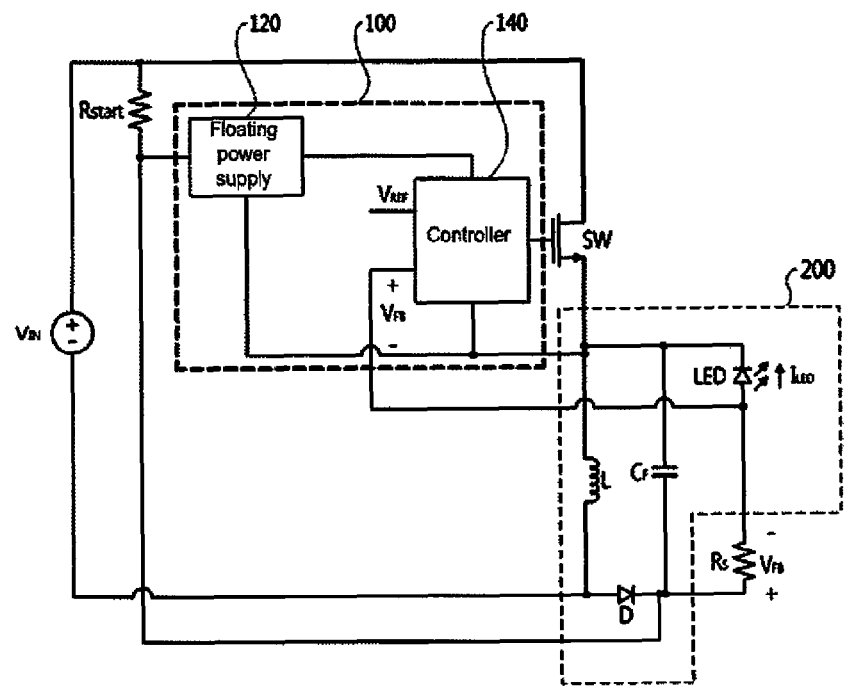

In an LED driving circuit illustrated in FIG. 20 compared to FIG. 15, the positions of the sensing resistor Rs and the LED are interchanged with each other. In FIG. 20, one end of the LED connected to the sensing resistor Rs is connected to an input terminal of the feedback voltage $V_{FB}$ of the controller 140, and the other end of the LED is connected to have the same reference voltage as the controller 140.

Figure 21:
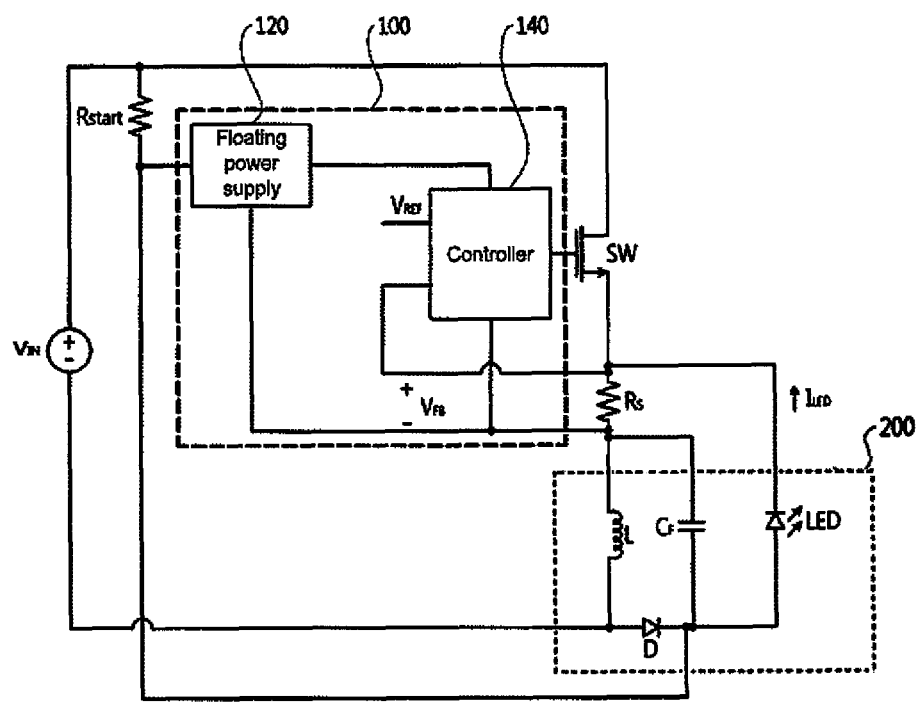

In an LED driving circuit illustrated in FIG. 21 compared to the circuit of FIG. 15, the filter capacitor $C_F$ is connected to the inductor L in parallel through the diode D, and a circuit including the filter capacitor $C_F$ and the inductor L is connected to the sensing resistor Rs in series and connected to the LED in series.

Figure 22:
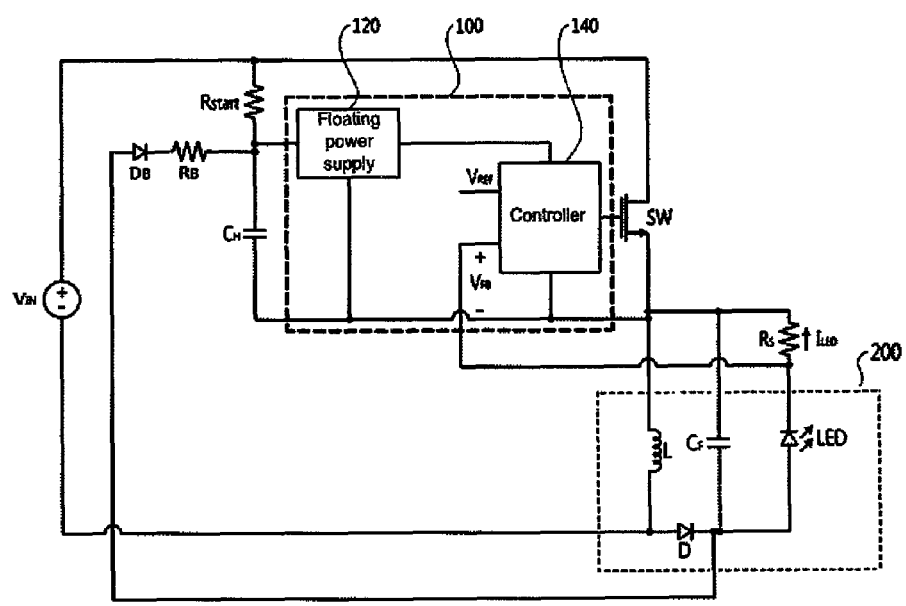

As compared to the circuit of FIG. 15, an LED driving circuit illustrated in FIG. 22 further includes a diode DB between the filter capacitor $C_F$ and the floating power supply 120. By preventing a current passing through the start resistor Rstart from being initially input from an input power supply Vin to the filter capacitor $C_F$, a diode D between the filter capacitor $C_F$ and the floating power supply 120 changes a start-up time or enables the LED driving circuit to be stably operated. A configuration circuit of the floating power supply illustrated in FIG. 22 is applicable to all modified circuits of FIG. 15.

Figure 23:
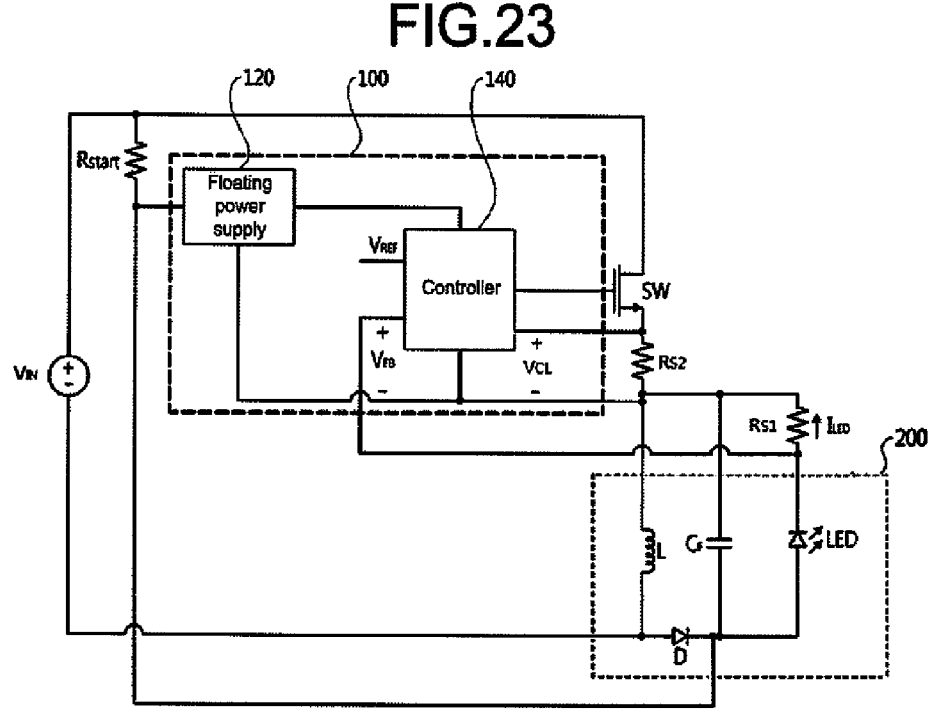

An LED driving circuit illustrated in FIG. 23 compared to the circuit of FIG. 15 further includes a second sensing resistor Rs2 and a second feedback voltage $V_{CL}$ to be fed back to the controller 140 by the second sensing resistor Rs2. A function of detecting a current flowing through the inductor and feeding the second feedback voltage $V_{CL}$ back to the controller is provided.

Figure 24:
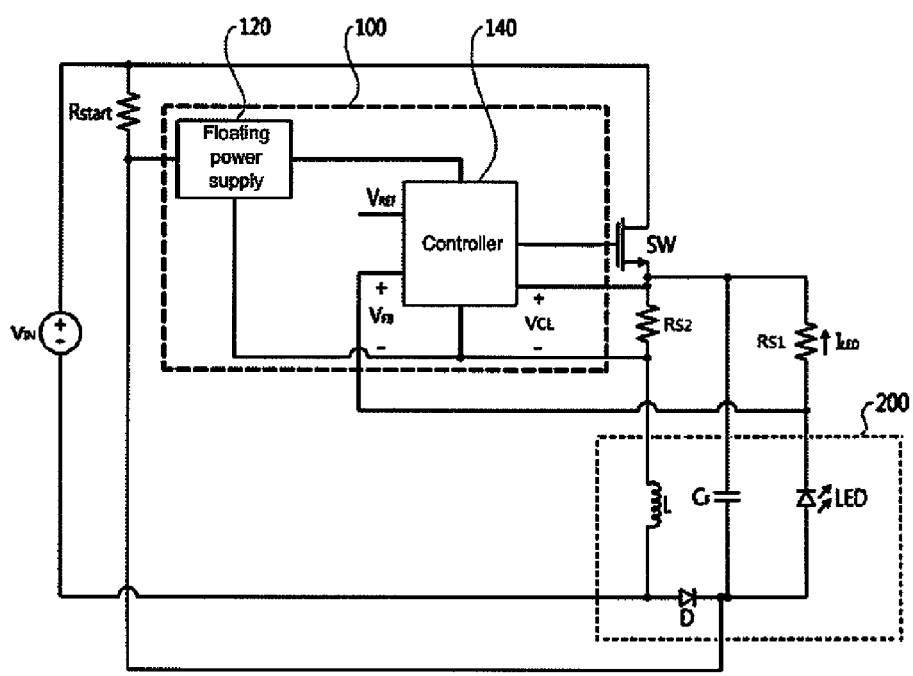

In an LED driving circuit illustrated in FIG. 24 compared to the circuit illustrated in FIG. 23, a connection node between the sensing resistor Rs1 and the filter capacitor $C_F$ is connected between the second sensing resistor Rs2 and a switch without being connected to the common voltage of the controller 140. A function of detecting a current flowing through the inductor L and feeding the second feedback voltage $V_{CL}$ to the controller 140 is provided.

Figure 25:
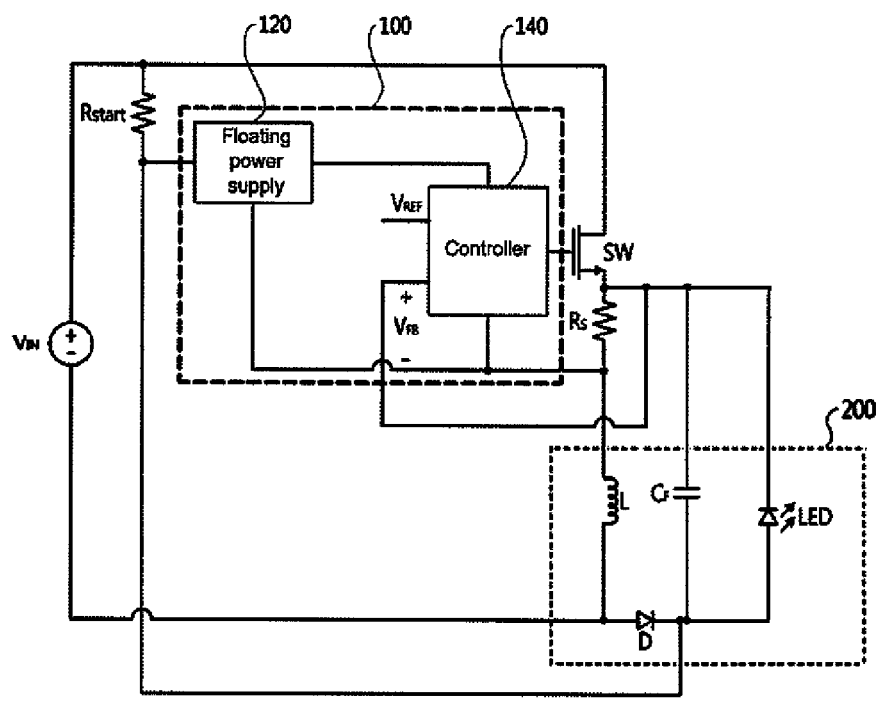

As compared to the circuit illustrated in FIG. 24, an LED driving circuit illustrated in FIG. 25 feeds a feedback voltage across the second sensing resistor Rs2 back to the controller 140 without using the first sensing resistor Rs1. The sensing resistor Rs feeds the feedback voltage $V_{FB}$ back to the controller 140 by detecting a current of the inductor L, and the controller 140 controls a current flowing through the LED through current control of the inductor L.

It will be apparent to those skilled in the art that various modifications can be made to the above-described exemplary embodiments of the present invention without departing from the spirit or scope of the invention. Thus, it is intended that the disclosed technology covers all such modifications provided they come within the scope of the appended claims and their equivalents.

The invention claimed is:

1. A light-emitting diode (LED) driving circuit comprising:
 a switching element configured to provide or block input power to an LED;
 a first sensing element electrically connected to the LED and configured to generate a feedback voltage corresponding to a current flowing through the LED;
 a controller connected to a common voltage and configured to control an on/off operation of the switching element on the basis of the feedback voltage; and
 a first inductor and a diode electrically connected to the LED and configured to provide the LED with a current induced during the on operation when the switching element is turned off,
 wherein the first sensing element is connected to the LED in series,
 one end of the first sensing element is connected to an input terminal of the controller, wherein the feedback voltage is input to the controller through the input terminal,
 the other end of the first sensing element is connected to the common voltage,
 wherein the LED driving circuit further comprises a filter capacitor connected to the first sensing element and the LED in parallel and configured to reduce a ripple of a current flowing through the LED.

2. A light-emitting diode (LED) driving circuit comprising:
 a switching element configured to provide or block input power to an LED;
 a first sensing element electrically connected to the LED and configured to generate a feedback voltage corresponding to a current flowing through the LED;
 a controller connected to a common voltage and configured to control an on/off operation of the switching element on the basis of the feedback voltage;
 a first inductor and a diode electrically connected to the LED and configured to provide the LED with a current induced during the on operation when the switching element is turned off; and
 a filter capacitor configured to perform a charging operation if the switching element is turned off and provide a current to the first sensing element and the LED if the switching element is turned on,
 wherein:
 the first sensing element is connected to the LED in series, and
 the filter capacitor is connected to a circuit including the LED and the first sensing element in parallel and connected to the first inductor in parallel through the diode.

3. The LED driving circuit according to claim 2, wherein:
 one end of the first sensing element is connected to an input terminal of the controller, wherein the feedback voltage is input to the controller through the input terminal; and
 the other end of the first sensing element is connected to the common voltage.

4. The LED driving circuit according to claim 2, wherein:
 a common node between the filter capacitor and the LED is connected to a floating power supply through the diode and a resistor.

5. The LED driving circuit according to claim 2, wherein:
 one end of the first sensing element is connected to the common voltage and the LED; and
 the other end of the first sensing element is connected to an input terminal of the controller,
 wherein the feedback voltage is input to the controller through the input terminal.

6. The LED driving circuit according to claim 2, wherein:
 one end of the LED is connected to an input terminal of the controller, wherein the feedback voltage is input to the controller; and
 the other end of the LED is connected to the common voltage.

* * * * *